(12) United States Patent
Ke et al.

(10) Patent No.: US 10,353,896 B2
(45) Date of Patent: Jul. 16, 2019

(54) DATA PROCESSING METHOD AND APPARATUS

(71) Applicant: Huawei Technologies Co., Ltd., Shenzhen (CN)

(72) Inventors: Liang Ke, Shenzhen (CN); Huaizhou Li, Hangzhou (CN); Yuhu Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 265 days.

(21) Appl. No.: 15/372,489

(22) Filed: Dec. 8, 2016

(65) Prior Publication Data

US 2017/0091273 A1    Mar. 30, 2017

Related U.S. Application Data

(63) Continuation of application No. PCT/CN2014/079453, filed on Jun. 9, 2014.

(51) Int. Cl.
*G06F 16/24* (2019.01)
*G06F 16/2453* (2019.01)
*G06F 16/2455* (2019.01)
*G06F 7/57* (2006.01)

(52) U.S. Cl.
CPC .......... *G06F 16/24542* (2019.01); *G06F 7/57* (2013.01); *G06F 16/24554* (2019.01)

(58) Field of Classification Search
CPC . G06F 17/30463; G06F 17/30486; G06F 7/57
See application file for complete search history.

(56) References Cited

U.S. PATENT DOCUMENTS

| | | | | |
|---|---|---|---|---|
| 2004/0260684 | A1* | 12/2004 | Agrawal | G06F 17/30312 |
| 2006/0218123 | A1* | 9/2006 | Chowdhuri | G06F 17/30445 |
| 2009/0254916 | A1* | 10/2009 | Bose | G06F 9/5066 |
| | | | | 718/104 |

(Continued)

FOREIGN PATENT DOCUMENTS

| | | |
|---|---|---|
| CN | 1545023 A | 11/2004 |
| CN | 201965621 U | 9/2011 |
| CN | 103729442 A | 4/2014 |

OTHER PUBLICATIONS

Machine Translation and Abstract of Chinese Publication No. CN1545023, Nov. 10, 2004, 8 pages.

(Continued)

*Primary Examiner* — Kris E Mackes
*Assistant Examiner* — Tiffany Thuy Bui
(74) *Attorney, Agent, or Firm* — Conley Rose, P.C.

(57) ABSTRACT

A data processing method and apparatus are provided. The data processing method includes determining, according to a database execution plan, a partition quantity corresponding to a currently free programmable memory, partitioning the currently free programmable memory according to the partition quantity, to obtain a programmable memory partition corresponding to the partition quantity, and executing, using the programmable memory partition, a relational algebra logical operation corresponding to the database execution plan. Embodiments of the present disclosure can be used to improve data processing efficiency.

17 Claims, 9 Drawing Sheets

---

Determine, according to a database execution plan, a partition quantity corresponding to a currently free programmable memory — 101

Partition the currently free programmable memory according to the partition quantity, to obtain a programmable memory partition corresponding to the partition quantity — 102

Execute, by using the programmable memory partition, a relational algebra logical operation corresponding to the database execution plan — 103

(56) References Cited

U.S. PATENT DOCUMENTS

| | | | |
|---|---|---|---|
| 2010/0191720 A1* | 7/2010 | Al-Omari | G06F 17/30463 707/718 |
| 2011/0047144 A1* | 2/2011 | Han | G06F 17/30445 707/718 |
| 2012/0243283 A1 | 9/2012 | Akerib et al. | |
| 2012/0243284 A1 | 9/2012 | Akerib et al. | |
| 2014/0032509 A1 | 1/2014 | Sukhwani et al. | |
| 2015/0066972 A1* | 3/2015 | Liu | G06F 17/30442 707/765 |
| 2015/0220600 A1* | 8/2015 | Bellamkonda | G06F 17/30498 707/747 |
| 2015/0254264 A1 | 9/2015 | Yu et al. | |
| 2016/0092541 A1* | 3/2016 | Liu | G06F 17/30584 707/715 |
| 2016/0246842 A1* | 8/2016 | Li | G06F 17/30445 |

OTHER PUBLICATIONS

Machine Translation and Abstract of Chinese Publication No. CN201965621, Sep. 7, 2011, 3 pages.
Foreign Communication From a Counterpart Application, PCT Application No. PCT/CN2014/079453, English Translation of International Search Report dated Dec. 30, 2014, 2 pages.
Foreign Communication From a Counterpart Application, PCT Application No. PCT/CN2014/079453, English Translation of Written Opinion dated Dec. 30, 2014, 8 pages.
Foreign Communication From a Counterpart Application, Chinese Application No. 201480037525.0, Chinese Office Action dated May 8, 2018, 5 pages.

* cited by examiner

DATA PROCESSING METHOD AND APPARATUS

CROSS-REFERENCE TO RELATED APPLICATIONS

This application is a continuation of International Application No. PCT/CN2014/079453, filed on Jun. 9, 2014, the disclosure of which is hereby incorporated by reference in its entirety.

TECHNICAL FIELD

The present disclosure relates to the field of computer technologies, and in particular, to a data processing method and apparatus.

BACKGROUND

In an existing data processing system, each synergistic processing unit (SPU) may be interconnected to a host using a network interface card (NIC). The SPU includes configurations such as a central processing unit (CPU) and a memory, and a rear end of the SPU is connected to a magnetic disk. Generally, a field programmable gate array (FPGA) used as an accelerator engine is integrated inside the SPU to assist in work such as data selection or compression.

Generally, the FPGA is disposed between the memory and the CPU. It can be seen that a data flow needs to flow between the CPU, the FPGA, and the memory. In actual application, the CPU, the FPGA, and the memory are generally different in input/output (I/O) bandwidth. Therefore, the data flow between the CPU, the FPGA, and the memory may cause low data processing efficiency.

SUMMARY

Embodiments of the present disclosure provide a data processing method and apparatus which can improve data processing efficiency.

To resolve the foregoing technical problem, the embodiments of the present disclosure disclose the following technical solutions.

According to a first aspect, a data processing method is provided, including determining, according to a database execution plan, a partition quantity corresponding to a currently free programmable memory, partitioning the currently free programmable memory according to the partition quantity to obtain a programmable memory partition corresponding to the partition quantity, and executing, using the programmable memory partition, a relational algebra logical operation corresponding to the database execution plan.

With reference to the foregoing first aspect, in a first implementation manner, determining, according to the database execution plan, the partition quantity corresponding to the currently free programmable memory includes collecting statistics about an optimal value op of a ratio of a data throughput processed when the free programmable memory executes the relational algebra logical operation to a size of the free programmable memory, generating an execution plan tree according to the database execution plan, determining, according to the database execution plan, an estimated value rc of a data volume required for the database execution plan, traversing the execution plan tree to find a maximum value rp of a ratio of a data area to a complementary area, where the data area and the complementary area are required for a relational algebra logical operation of a node on the execution plan tree, the data area refers to storage space for storing I/O data information of the relational algebra logical operation, and the complementary area refers to storage space for storing temporary data information obtained during the relational algebra logical operation, obtaining an amount mc of the currently free programmable memory, and determining, according to op, rc, rp, and mc, the partition quantity corresponding to the currently free programmable memory.

With reference to the foregoing first implementation manner, in a second implementation manner, before executing, using the programmable memory partition, the relational algebra logical operation corresponding to the database execution plan, the method further includes flashing a relational algebra logic set into the programmable memory partition, where the relational algebra logic set includes the relational algebra logical operation corresponding to the database execution plan.

With reference to the foregoing first implementation manner and second implementation manner, in a third implementation manner, executing, using the programmable memory partition, the relational algebra logical operation corresponding to the database execution plan includes obtaining, according to the execution plan tree, execution sequence information of relational algebra logic corresponding to the database execution plan and sequentially activating relational algebra logic in the programmable memory partition according to the execution sequence information to execute an operation.

With reference to the foregoing third implementation manner, in a fourth implementation manner, activating the relational algebra logic in the programmable memory partition to execute an operation includes, when the activated relational algebra logic is a unary operator, directly obtaining data in a programmable memory partition corresponding to the unary operator to execute an operation, and when the activated relational algebra logic is a binary operator and two programmable memory partitions corresponding to the binary operator have same execution sequence information, synchronizing data addressing information in the two programmable memory partitions corresponding to the binary operator, and executing a currently active logical operation by a programmable memory partition in the two programmable memory partitions that has a larger data volume.

With reference to the foregoing first implementation manner, in a fifth implementation manner, executing, using the programmable memory partition, the relational algebra logical operation corresponding to the database execution plan includes obtaining, according to the execution plan tree, logic execution sequence information of a relational algebra operator corresponding to the database execution plan, and sending a logical instruction to the programmable memory partition according to the logic execution sequence information, where the logical instruction is used to drive the programmable memory partition to execute a logical operation.

With reference to the foregoing third implementation manner and fifth implementation manner, in a sixth implementation manner, executing, using the programmable memory partition, the relational algebra logical operation corresponding to the database execution plan further includes, after all relational algebra logical operations corresponding to the logic execution sequence information are executed, determining whether to execute an aggregation operation on operation results distributed in different programmable memory partitions, and if the aggregation operation needs to be executed, activating a logic aggregation operation, and generating a final result according to the operation results distributed in the different programmable memory partitions.

According to a second aspect, a data processing apparatus is provided, including a partition quantity determining module configured to determine, according to a database execution plan, a partition quantity corresponding to a currently free programmable memory, a partition module configured to partition the currently free programmable memory according to the partition quantity to obtain a programmable memory partition corresponding to the partition quantity, and an operation module configured to execute, using the programmable memory partition, a relational algebra logical operation corresponding to the database execution plan.

With reference to the foregoing second aspect, in a first implementation manner, the partition quantity determining module includes a first parameter unit configured to collect statistics about an optimal value op of a ratio of a data throughput processed when the free programmable memory executes the relational algebra logical operation to a size of the free programmable memory, a second parameter unit configured to generate an execution plan tree according to the database execution plan and determine according to the database execution plan, an estimated value rc of a data volume required for the database execution plan, a third parameter unit configured to traverse the execution plan tree to find a maximum value rp of a ratio of a data area to a complementary area, where the data area and the complementary area are required for a relational algebra logical operation of a node on the execution plan tree, the data area refers to storage space for storing I/O data information of the relational algebra logical operation, and the complementary area refers to storage space for storing temporary data information obtained during the relational algebra logical operation, a fourth parameter unit configured to obtain an amount mc of the currently free programmable memory, and a quantity determining unit configured to determine, according to op, rc, rp, and mc, the partition quantity corresponding to the currently free programmable memory.

With reference to the foregoing first implementation manner, in a second implementation manner, the apparatus further includes a logic flashing module configured to flash a relational algebra logic set into the programmable memory partition, where the relational algebra logic set includes the relational algebra logical operation corresponding to the database execution plan.

With reference to the foregoing first implementation manner and second implementation manner, in a third implementation manner, the operation module includes an execution sequence obtaining unit configured to obtain, according to the execution plan tree, execution sequence information of relational algebra logic corresponding to the database execution plan and a logic activation unit configured to sequentially activate relational algebra logic in the programmable memory partition according to the execution sequence information to execute an operation.

With reference to the foregoing third implementation manner, in a fourth implementation manner, the logic activation unit includes a first activation subunit configured to, when the activated relational algebra logic is a unary operator, directly obtain data in a programmable memory partition corresponding to the unary operator to execute an operation and a second activation subunit configured to, when the activated relational algebra logic is a binary operator and two programmable memory partitions corresponding to the binary operator have same execution sequence information, synchronize data addressing information in the two programmable memory partitions corresponding to the binary operator, and execute a currently active logical operation by a programmable memory partition in the two programmable memory partitions that has a larger data volume.

With reference to the foregoing first implementation manner, in a fifth implementation manner, the operation module includes an execution sequence obtaining unit configured to obtain, according to the execution plan tree, execution sequence information of relational algebra logic corresponding to the database execution plan and a logical instruction sending unit configured to send a logical instruction to the programmable memory partition according to the logic execution sequence information, where the logical instruction is used to drive the programmable memory partition to execute a logical operation.

With reference to the foregoing third implementation manner and fifth implementation manner, in a sixth implementation manner, the operation module further includes an aggregation determining unit configured to, after all relational algebra logical operations corresponding to the logic execution sequence information are executed, determine whether to execute an aggregation operation on operation results distributed in different programmable memory partitions and an aggregation unit configured to, if the aggregation operation needs to be executed, activate a logic aggregation operation and generate a final result according to the operation results distributed in the different programmable memory partitions.

According to a third aspect, a data processing apparatus is provided, including a processor, a memory, and a bus, where the processor and the memory are connected using the bus, the memory is configured to store a computer execution instruction, and the processor is configured to execute the computer execution instruction stored in the memory so that the data processing apparatus executes the foregoing data processing method.

In the embodiments of the present disclosure, a free programmable memory is partitioned according to a database execution plan, and a programmable memory partition is invoked using a programmable memory technology to execute a corresponding logical operation. It can be seen that, to-be-processed data does not need to be transmitted, using a memory bus, to a processor for processing, and a memory itself performs data processing, thereby implementing a technical effect of locally implementing data processing in the memory. Because data is locally processed in the memory, a process of transmitting the data between the processor and the memory is avoided, and whether I/O bandwidth of the processor is the same as I/O bandwidth of the memory does not affect a data processing process performed in the memory, thereby improving data processing efficiency.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make a person skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

Figure 1:
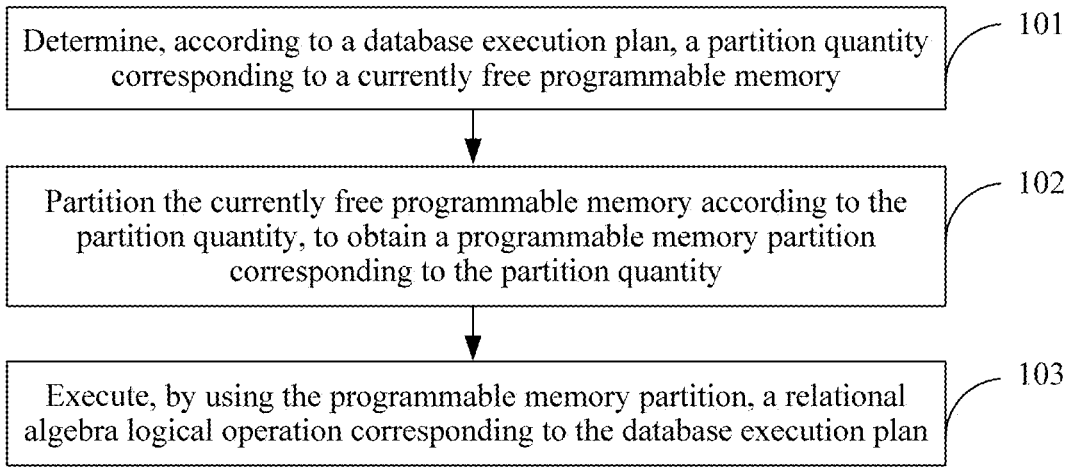
FIG. 1 is a schematic flowchart of an embodiment of a data processing method according to the present disclosure.

FIG. 1 shows an embodiment of a data processing method according to the present disclosure and the method may include the following execution steps.

Step 101. Determine, according to a database execution plan, a partition quantity corresponding to a currently free programmable memory.

In this embodiment of the present disclosure, to improve data processing efficiency, a memory used for programming and calculation is a free memory in a system. A programmable interface is provided for the memory and a specific calculation capability is granted to a free memory area using the programmable interface.

In the foregoing step, when an operating system loads a database application, the currently free programmable memory needs to be partitioned to facilitate subsequent invoking of a corresponding free programmable memory partition to execute a logical operation. In addition, the partition quantity needs to be determined according to the database execution plan. The database execution plan refers to a description of an execution process or an access path of a query statement in a database system, for example, a detailed scheme about how to complete a query task. Different database execution plans need different processing capabilities and correspondingly need different quantities of programmable memory partitions.

Step 102. Partition the currently free programmable memory according to the partition quantity to obtain a programmable memory partition corresponding to the partition quantity.

In this step, when the partition quantity is determined according to the database execution plan, the free programmable memory can be partitioned to obtain the programmable memory partition corresponding to the partition quantity.

Step 103. Execute, using the programmable memory partition, a relational algebra logical operation corresponding to the database execution plan.

In this step, because a programmable memory partition has a specific calculation capability, a corresponding relational algebra logical operation may be executed using the programmable memory partition.

In this embodiment of the present disclosure, a free programmable memory is partitioned according to a database execution plan and a programmable memory partition is invoked using a programmable memory technology to execute a corresponding logical operation. It can be seen that, to-be-processed data does not need to be transmitted, using a memory bus, to a processor for processing, and a memory itself performs data processing, thereby implementing a technical effect of locally implementing data processing in the memory. Because data is locally processed in the memory, a process of transmitting the data between the processor and the memory is avoided, and whether I/O bandwidth of the processor is the same as I/O bandwidth of the memory does not affect a data processing process performed in the memory, thereby improving data processing efficiency.

To facilitate understanding of this solution, the foregoing data processing method is described in detail in the following using specific embodiments.

Figure 2:
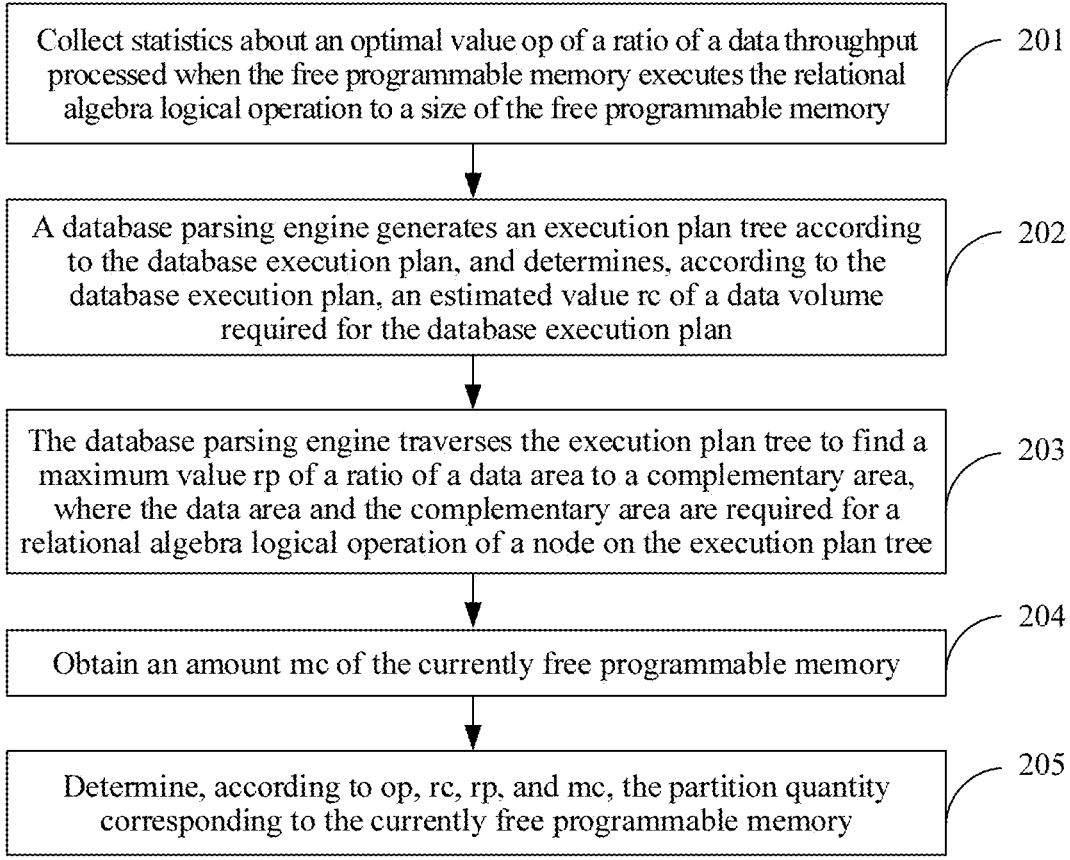
FIG. 2 is a schematic diagram of an implementation procedure of step 101 in FIG. 1.

In this embodiment of the present disclosure, an implementation manner of determining, according to a database execution plan, a partition quantity corresponding to a currently free programmable memory is shown in FIG. 2, and includes the following execution steps.

Step 201. Collect statistics about an optimal value op of a ratio of a data throughput processed when the free programmable memory executes the relational algebra logical operation to a size of the free programmable memory.

A statistical analysis may be performed on statistics data herein according to historical data of the data throughput processed during execution of the relational algebra logical operation and historical data of the size of the used free programmable memory to determine the optimal value op of the ratio between the two.

Step 202. A database parsing engine (for example, Structured Language Query parse (SQLparse)) generates an execution plan tree according to the database execution plan and determines, according to the database execution plan, an estimated value rc of a data volume required for the database execution plan.

Step 203. The database parsing engine traverses the execution plan tree to find a maximum value rp of a ratio of a data area to a complementary area, where the data area and the complementary area are required for a relational algebra logical operation of a node on the execution plan tree.

Step 204. Obtain an amount mc of the currently free programmable memory.

Step 205. Determine, according to op, rc, rp, and mc, the partition quantity corresponding to the currently free programmable memory.

It should be noted that, a method for calculating the partition quantity according to op, rc, rp, and mc includes, but is not limited to, a function mapping relationship between op, rc, rp, and mc. A parameter factor for determining the partition quantity includes rp, op, rc, and mc, and the quantity n of partitions equals f(rp, op, rc, mc), where the quantity n of partitions is in a directly proportional relationship with mc, the quantity n of partitions is inversely proportional to rc and rp, and op is generally a constant coefficient.

Figure 3:
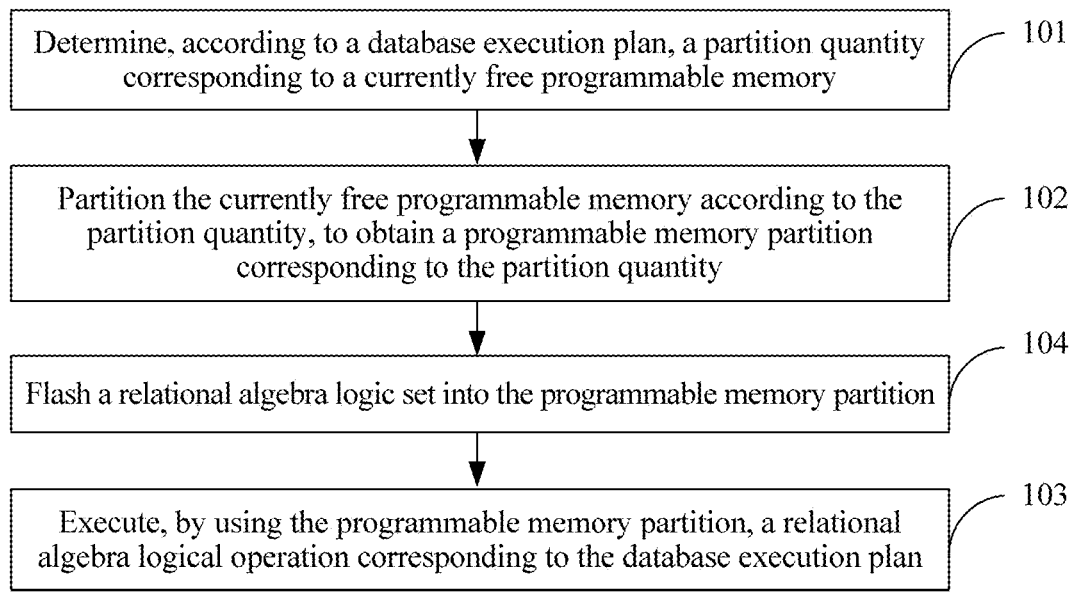
FIG. 3 is a schematic flowchart of an embodiment of another data processing method according to the present disclosure.

In another embodiment provided in the present disclosure, as shown in FIG. 3, before step 103, the method further includes the following execution step.

Step 104. Flash a relational algebra logic set into the programmable memory partition.

In this embodiment, a free memory is a programmable memory. Therefore, a free programmable memory partition may have a specific calculation capability in a manner of flashing the relational algebra logic set. This process may be understood as an initialization process of the free programmable memory partition. Further, a subsequent corresponding logical operation may be executed using the free programmable memory partition and relational algebra logic in the relational algebra logic set herein may implement an operation of a relational algebra operator.

Figure 4:
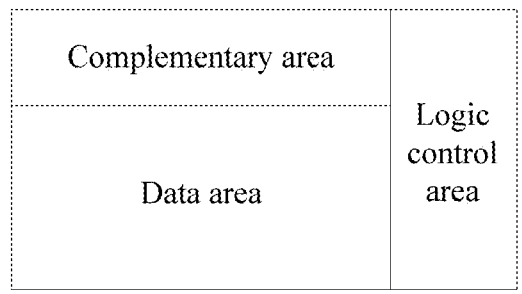
FIG. 4 is a schematic structural diagram of a programmable memory partition according to an embodiment of the present disclosure.

For ease of understanding, a structure of the programmable memory partition in this embodiment of the present disclosure is described in the following. As shown in FIG. 4, FIG. 4 is a schematic structural diagram of the programmable memory partition and the programmable memory partition includes a data area, a complementary area, and a logic control area. The data area is used to store I/O data information of a relational algebra logical operation, the complementary area is used to store temporary data information obtained during the relational algebra logical operation, the logic control area is a programmable logic area, and operation logic may be flashed into the logic control area using a programmable interface to provide a calculation capability for the memory partition.

Therefore, in the embodiment shown in FIG. 3, the relational algebra logic set is flashed into the logic control area in the programmable memory partition so that the programmable memory partition has the specific calculation capability.

Figure 5:
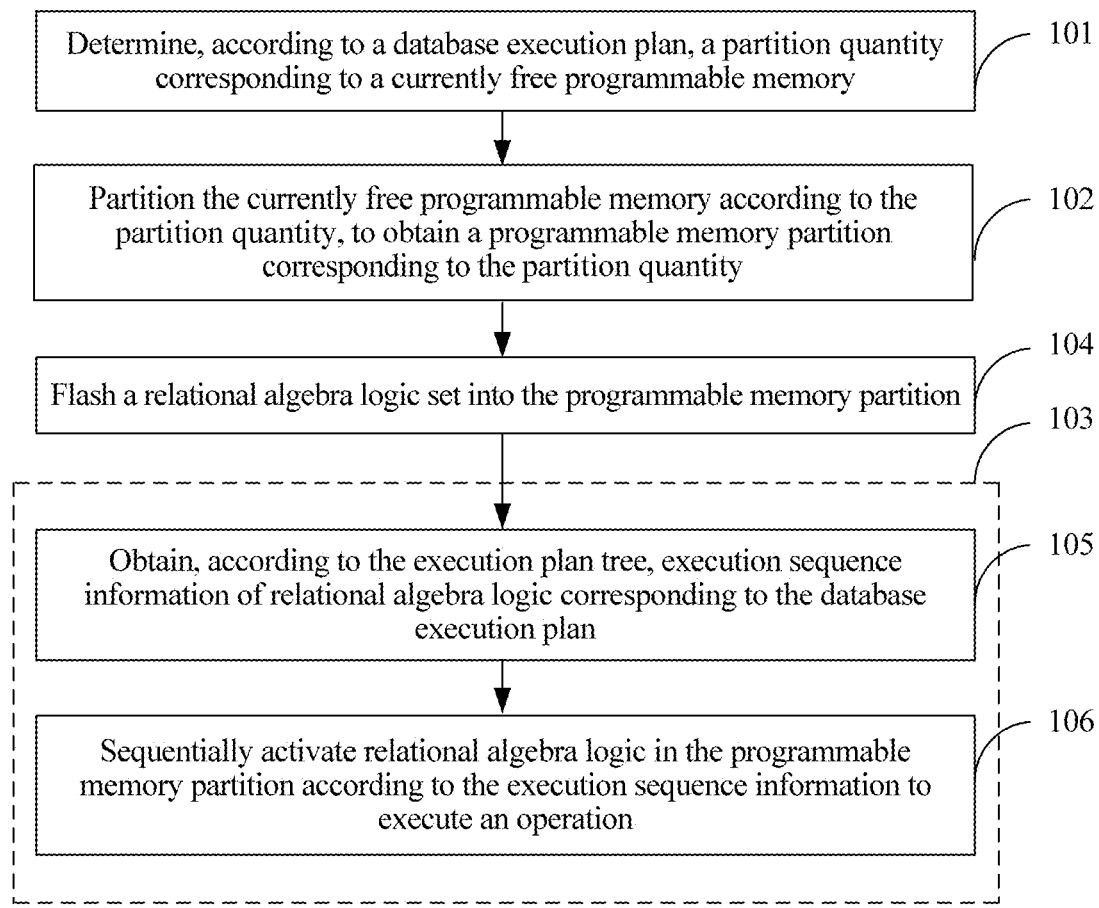
FIG. 5 is a schematic diagram of an implementation procedure of step 103 in FIG. 1.

After the programmable memory partition completes the initialization process, the corresponding logical operation may be executed using the programmable memory partition. FIG. 5 shows a procedure of this execution stage, which may include:

Step 105. Obtain, according to the execution plan tree, execution sequence information (for example, a task queue) of relational algebra logic corresponding to the database execution plan.

Step 106. Sequentially activate relational algebra logic in the programmable memory partition according to the execution sequence information to execute an operation.

In this embodiment, the task queue of the relational algebra logic corresponding to the database execution plan may be obtained from the execution plan tree generated by the SQL parse, and then, n programmable memory partitions are notified according to the task queue and relational algebra logic in a corresponding partition is activated to execute an operation. An activation operation may be executed starting from the first relational algebra logic and according to a sequence of relational algebra logic in the task queue. After the first relational algebra logic is executed, an activation operation is executed on next relational algebra logic until all relational algebra logical operations in the task queue are completed.

It can be seen that, in this embodiment of the present disclosure, a programmable memory may be partitioned, simultaneous execution of multiple partitions are driven according to a database execution plan, and a capability of simultaneously executing logical operations by multiple calculation units is provided. Therefore, a technical effect of parallel execution of the database execution plan is implemented and data processing efficiency is significantly improved.

Figure 6:
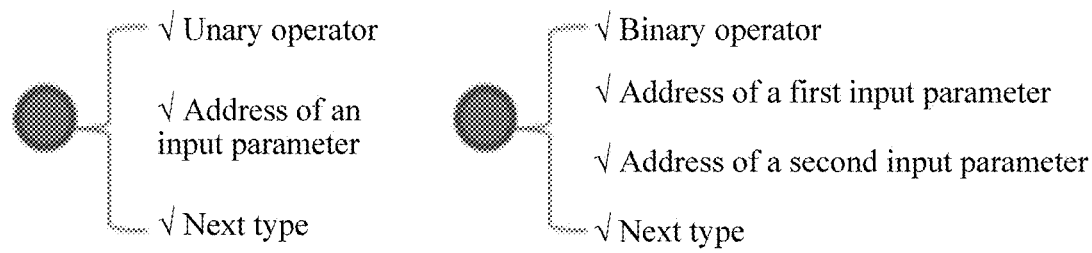
FIG. 6 is a schematic diagram of a unary operator and a binary operator according to an embodiment of the present disclosure.

In a specific application scenario, according to a quantity of parameters added into the relational algebra logic, the relational algebra logic may be classified into two types, a unary operator and a binary operator, as shown in FIG. 6, where the unary operator is a function that carries one parameter and the binary operator is a function that carries two parameters. An address of an input parameter indicates a memory address for the parameter and a next type indicates a type of next relational algebra logic and is a unary operator or a binary operator.

For different operators, operation activation manners are different, which are as follows. When the activated relational algebra logic is a unary operator, data in a programmable memory partition corresponding to the unary operator is directly obtained to execute an operation. When the activated relational algebra logic is a binary operator and two programmable memory partitions corresponding to the binary operator have same execution sequence information, data addressing information in the two programmable memory partitions corresponding to the binary operator is synchronized and a currently active logical operation is executed by a programmable memory partition in the two programmable memory partitions that has a larger data volume, thereby implementing a coordinated operation between partitions.

In the following, a detailed description is provided using a specific application scenario.

Figure 7:
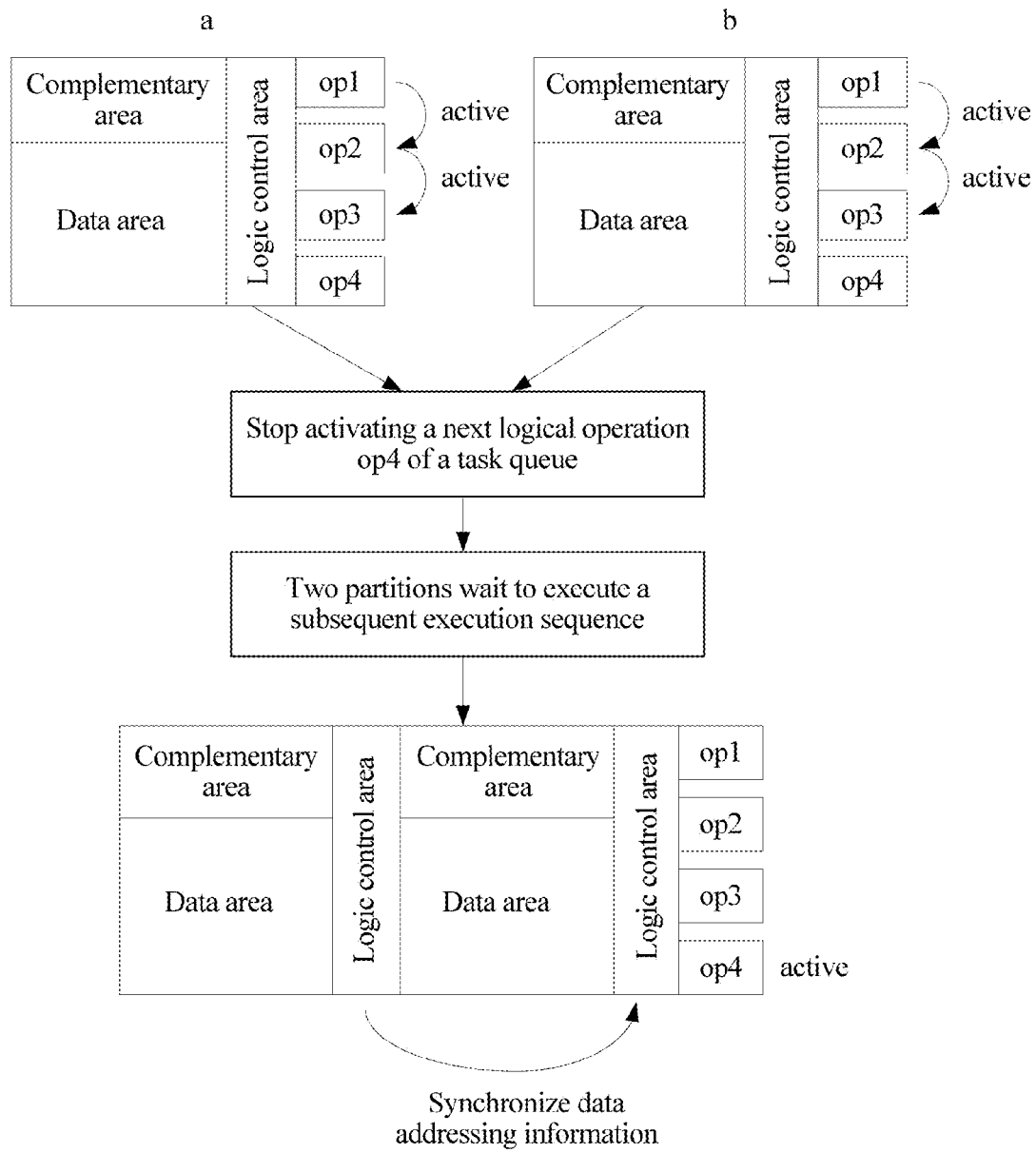
FIG. 7 is a schematic diagram of an activation operation process of a binary operator according to an embodiment of the present disclosure.

As shown in FIG. 7, two programmable memory partitions a and b have same execution sequence information, for example, execution sequences of both the two programmable memory partitions a and b are op1 to op4, where a unary operator is activated in op1 to op3, and a binary operator is activated in op4. In this case, op3 is already executed in a task queue. After the partition executes op3, a next logical operation op4 in the task queue is not activated, and the partition b executes op3. After the partition b also executes op3, a next logical operation op4 in the task queue is not activated either. That is, after both the partition a and the partition b complete op3 in their respective task queues, the two partitions wait to execute a subsequent execution sequence. Then, data addressing information in the two partitions is synchronized and a partition that has a larger data volume executes the op4 operation.

In one embodiment, after the op4 operation is executed, the partition that executes op4 needs to continue to determine whether a next logical operation further exists in the task queue and, if the next logical operation further exists in the task queue, this partition continues to execute the next logical operation until the whole task queue is executed.

In the foregoing embodiment, an implementation manner of flashing, after the programmable memory completes partitioning, the relational algebra logic set into the logic control area in the programmable memory partition to enable the programmable memory partition to have the specific calculation capability is described.

In an actual application scenario, whether the step of flashing the relational algebra logic set into the logic control area in the programmable memory partition is needed is determined according to a speed of writing logic into the logic control area in the memory partition, for example, performance of the memory. When a speed of writing a new instruction into the logic control area in the partition can be ignored, the step of flashing the relational algebra logic set into the logic control area may be omitted. When the speed of writing the new instruction into the logic control area in the partition is lower than a threshold and causes execution efficiency of the whole execution plan to be affected, the step of flashing the relational algebra logic set may be needed.

Figure 8:
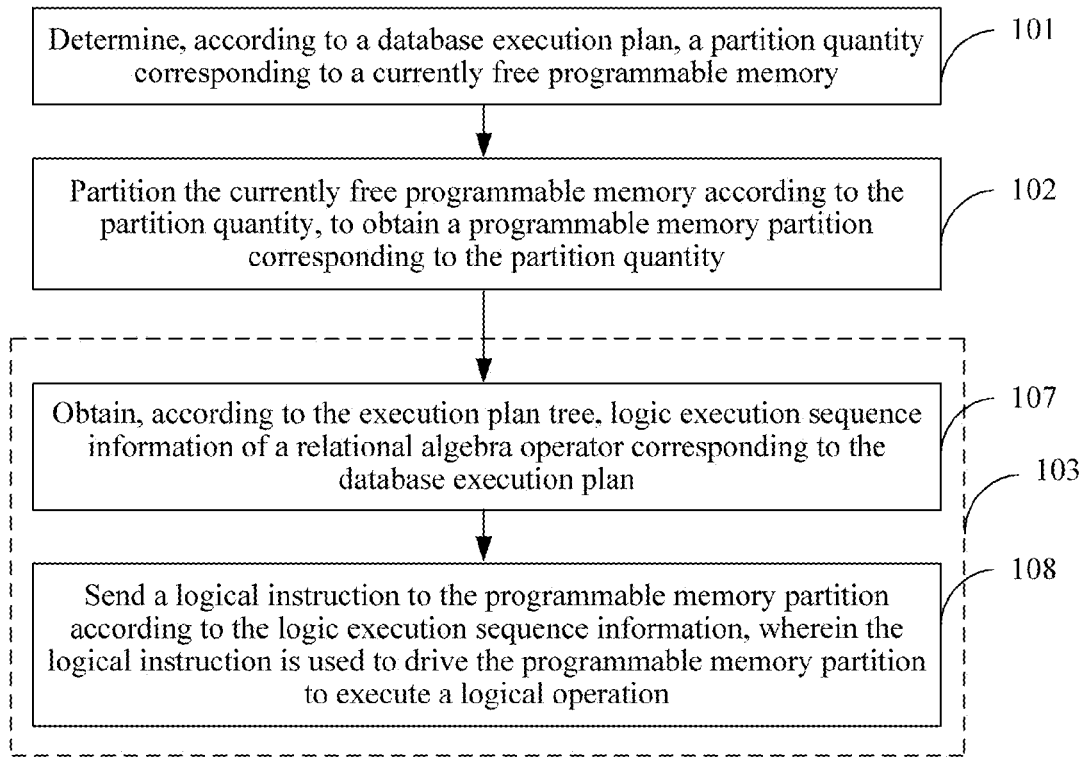
FIG. 8 is a schematic diagram of another implementation procedure of step 103 in FIG. 1.

In this application scenario, in a case in which the relational algebra logic set does not need to be flashed into the logic control area in the partition, another implementation manner of executing the corresponding logical operation using the programmable memory partition is shown in FIG. 8, and includes the following execution steps:

Step 107. Obtain, according to the execution plan tree, logic execution sequence information of a relational algebra operator corresponding to the database execution plan.

Step 108. Send a logical instruction to the programmable memory partition according to the logic execution sequence information, where the logical instruction is used to drive the programmable memory partition to execute a logical operation.

In this implementation manner, after the logic execution sequence information of the relational algebra operator corresponding to the execution plan tree is obtained, a logical instruction is sent to a corresponding programmable memory partition according to logic execution sequence information of a currently executed relational algebra logic operator to drive the corresponding programmable memory partition to execute a logical operation.

In addition, it should be noted that after all relational algebra logical operations corresponding to the logic execution sequence information are executed, operation results are generally distributed in programmable memory partitions, and in this case, whether an aggregation operation needs to be executed on the operation results distributed in different programmable memory partitions to generate a final result may be determined according to an actual scenario. If the aggregation operation needs to be executed, a logic aggregation operation is activated and the final result is generated according to the operation results distributed in the different programmable memory partitions.

Corresponding to the foregoing embodiment of the data processing method, the present disclosure provides a data processing apparatus.

Figure 9:
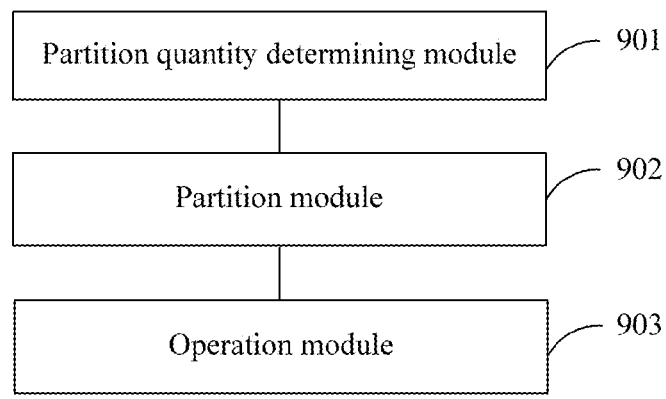
FIG. 9 is a schematic structural diagram of an embodiment of a data processing apparatus according to the present disclosure.

FIG. 9 shows an embodiment of a data processing apparatus according to the present disclosure and the apparatus may include a partition quantity determining module 901 configured to determine, according to a database execution plan, a partition quantity corresponding to a currently free programmable memory, a partition module 902 configured to partition the currently free programmable memory according to the partition quantity, to obtain a programmable memory partition corresponding to the partition quantity, and an operation module 903 configured to execute, using the programmable memory partition, a relational algebra logical operation corresponding to the database execution plan.

In this apparatus embodiment, to improve data processing efficiency, a memory for programming and calculation is a free memory in a system. A programmable interface is provided for the memory and a specific calculation capability is granted to a free memory area using the programmable interface. When an operating system loads a database application, the currently free programmable memory needs to be partitioned to facilitate subsequent invoking of a corresponding free programmable memory partition to execute a logical operation. In addition, the partition quantity needs to be determined according to the database execution plan. The database execution plan herein refers to a description of an execution process or an access path of a query statement in a database system, for example, a detailed scheme about how to complete a query task. Different database execution plans need different processing capabilities and correspondingly need different quantities of programmable memory partitions. When the partition quantity is determined according to the database execution plan, the free programmable memory can be partitioned to obtain the programmable memory partition corresponding to the partition quantity. Because a programmable memory partition has a specific calculation capability, a corresponding relational algebra logical operation may be executed using the programmable memory partition.

In this embodiment of the present disclosure, a free programmable memory is partitioned according to a database execution plan and a programmable memory partition is invoked using a programmable memory technology to execute a corresponding logical operation. It can be seen that to-be-processed data does not need to be transmitted, using a memory bus, to a processor for processing and a memory itself performs data processing, thereby implementing a technical effect of locally implementing data processing in the memory. Because data is locally processed in the memory, a process of transmitting the data between the processor and the memory is avoided and whether I/O bandwidth of the processor is the same as I/O bandwidth of the memory does not affect a data processing process performed in the memory, thereby improving data processing efficiency.

Figure 10:
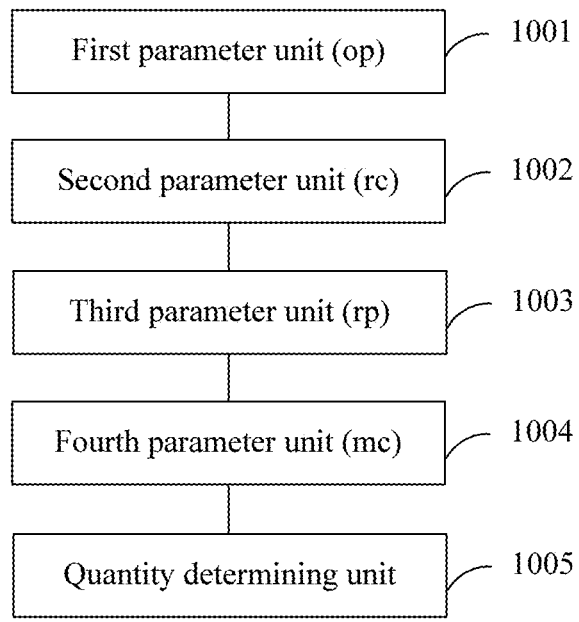
FIG. 10 is a schematic structural diagram of a partition quantity determining module in FIG. 9.

In an embodiment provided in the present disclosure, an implementation manner of the partition quantity determining module is provided. In this implementation manner, as shown in FIG. 10, the partition quantity determining module may include a first parameter unit 1001 configured to collect statistics about an optimal value op of a ratio of a data throughput processed when the free programmable memory executes the relational algebra logical operation to a size of the free programmable memory, a second parameter unit 1002 configured to generate an execution plan tree according to the database execution plan, and determine, according to the database execution plan, an estimated value rc of a data volume required for the database execution plan, a third parameter unit 1003 configured to traverse the execution plan tree to find a maximum value rp of a ratio of a data area to a complementary area, where the data area and the complementary area are required for a relational algebra logical operation of a node on the execution plan tree, the data area refers to storage space for storing I/O data information of the relational algebra logical operation, and the complementary area refers to storage space for storing temporary data information obtained during the relational algebra logical operation, a fourth parameter unit 1004 configured to obtain an amount mc of the currently free programmable memory, and a quantity determining unit 1005 configured to determine, according to op, rc, rp, and mc, the partition quantity corresponding to the currently free programmable memory.

In the foregoing implementation manner, a statistical analysis may be performed on statistics data of op according to historical data of the data throughput processed during execution of the relational algebra logical operation and historical data of the size of the used free programmable memory, to determine the optimal value of the ratio between the two.

The partition quantity may be calculated in a manner of a function mapping relationship. A parameter factor for determining the partition quantity includes rp, op, rc, and mc, and the quantity n of partitions equals f(rp, op, rc, mc), where the quantity n of partitions is in a directly proportional relationship with mc, the quantity n of partitions is inversely proportional to rc and rp, and op is generally a constant coefficient.

Figure 11:
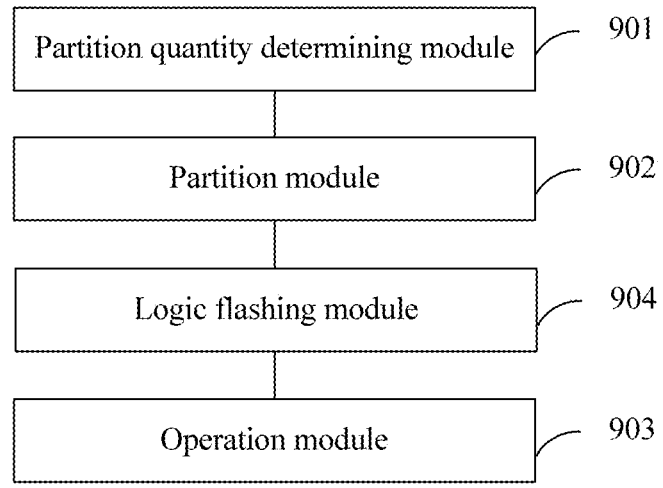
FIG. 11 is a schematic structural diagram of an embodiment of another data processing apparatus according to the present disclosure.

In another embodiment of the data processing apparatus according to the present disclosure, as shown in FIG. 11, the apparatus may further include a logic flashing module 904 configured to flash a relational algebra logic set into the programmable memory partition.

In this embodiment, a free memory is a programmable memory. Therefore, a free programmable memory partition may have a specific calculation capability in a manner of flashing the relational algebra logic set. This process may be understood as an initialization process of the free programmable memory partition. The relational algebra logic set is flashed into a logic control area in the free programmable memory partition so that the free programmable memory partition has the specific calculation capability. Further, a subsequent corresponding logical operation may be executed using the free programmable memory partition and relational algebra logic in the relational algebra logic set herein may implement an operation of a relational algebra operator.

Figure 12:
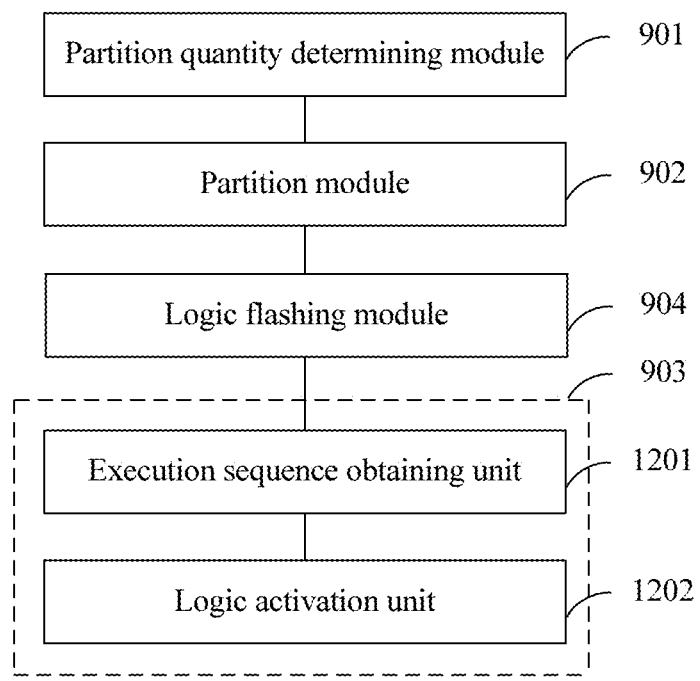
FIG. 12 is a schematic structural diagram of an operation module in FIG. 9.

Based on the embodiment of the data processing apparatus shown in FIG. 11, as shown in FIG. 12, the operation module may include an execution sequence obtaining unit 1201 configured to obtain, according to the execution plan tree, execution sequence information of relational algebra logic corresponding to the database execution plan and a logic activation unit 1202 configured to sequentially activate relational algebra logic in the programmable memory partition according to the execution sequence information to execute an operation.

In this embodiment, a task queue of the relational algebra logic corresponding to the database execution plan may be obtained from the execution plan tree generated by an SQLparse, and then, n programmable memory partitions are notified according to the task queue and relational algebra logic in a corresponding partition is activated to execute an operation. An activation operation may be executed starting from the first relational algebra logic and according to a sequence of relational algebra logic in the task queue. After the first relational algebra logic is executed, an activation operation is executed on next relational algebra logic until all relational algebra logical operations in the task queue are completed.

It can be seen that, in this embodiment of the present disclosure, a programmable memory may be partitioned, simultaneous execution of multiple partitions are driven according to a database execution plan and a capability of simultaneously executing logical operations by multiple calculation units is provided. Therefore, a technical effect of parallel execution of the database execution plan is implemented and data processing efficiency is significantly improved.

Figure 13:
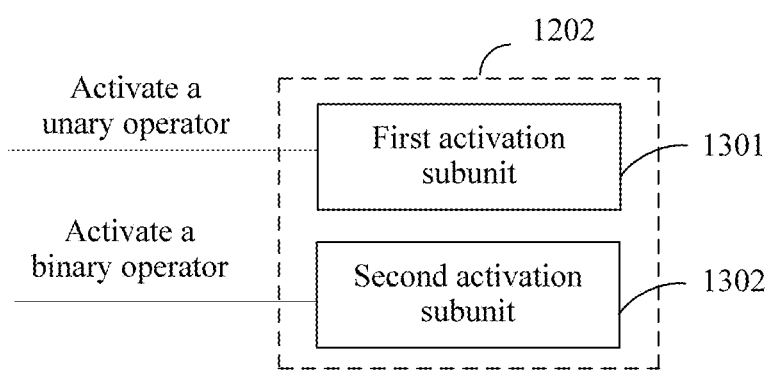
FIG. 13 is a schematic structural diagram of a logic activation unit in FIG. 12.

In a specific application scenario, according to a quantity of parameters added into the relational algebra logic, the relational algebra logic may be classified into a unary operator and a binary operator. For different operators, operation activation manners are different. Therefore, as shown in FIG. 13, the logic activation unit may include a first activation subunit 1301 configured to, when the activated relational algebra logic is a unary operator, directly obtain data in a programmable memory partition corresponding to the unary operator to execute an operation and a second activation subunit 1302 configured to, when the activated relational algebra logic is a binary operator and two programmable memory partitions corresponding to the binary operator have same execution sequence information, synchronize data addressing information in the two programmable memory partitions corresponding to the binary operator and execute a currently active logical operation by a programmable memory partition in the two programmable memory partitions that has a larger data volume.

In the foregoing embodiment of the operation module, an implementation manner of flashing, after the free programmable memory completes partitioning, the relational algebra logic set into the logic control area in the programmable memory partition to enable the programmable memory partition to have the specific calculation capability is described.

In an actual application scenario, whether the step of flashing the relational algebra logic set into the logic control area in the programmable memory partition is needed is determined according to a speed of writing logic into the logic control area in the memory partition, for example, performance of the memory. When a speed of writing a new instruction into the logic control area in the partition can be ignored, the step of flashing the relational algebra logic set into the logic control area may be omitted. When the speed of writing the new instruction into the logic control area in the partition is lower than a threshold and causes execution efficiency of the whole execution plan to be affected, the step of flashing the relational algebra logic set is needed.

Figure 14:
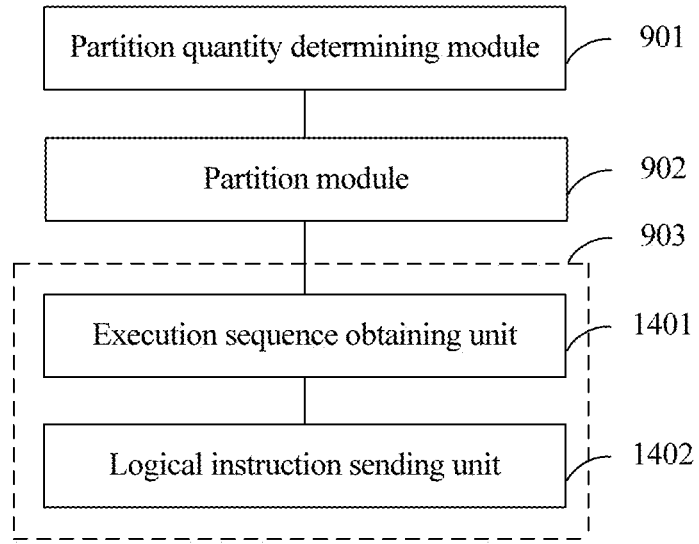
FIG. 14 is another schematic structural diagram of an operation module in FIG. 9.

In this application scenario, in a case in which the relational algebra logic set does not need to be flashed into the logic control area in the partition, another embodiment of the operation module is shown in FIG. 14, and the operation module may include an execution sequence obtaining unit 1401 configured to obtain, according to the execution plan tree, execution sequence information of relational algebra logic corresponding to the database execution plan and a logical instruction sending unit 1402 configured to send a logical instruction to the programmable memory partition according to the logic execution sequence information, where the logical instruction is used to drive the programmable memory partition to execute a logical operation.

In this implementation manner, after the logic execution sequence information of the relational algebra operator corresponding to the execution plan tree is obtained, a logical instruction is sent to a corresponding programmable memory partition according to logic execution sequence information of a currently executed relational algebra logic operator to drive the corresponding programmable memory partition to execute a logical operation.

Figure 15:
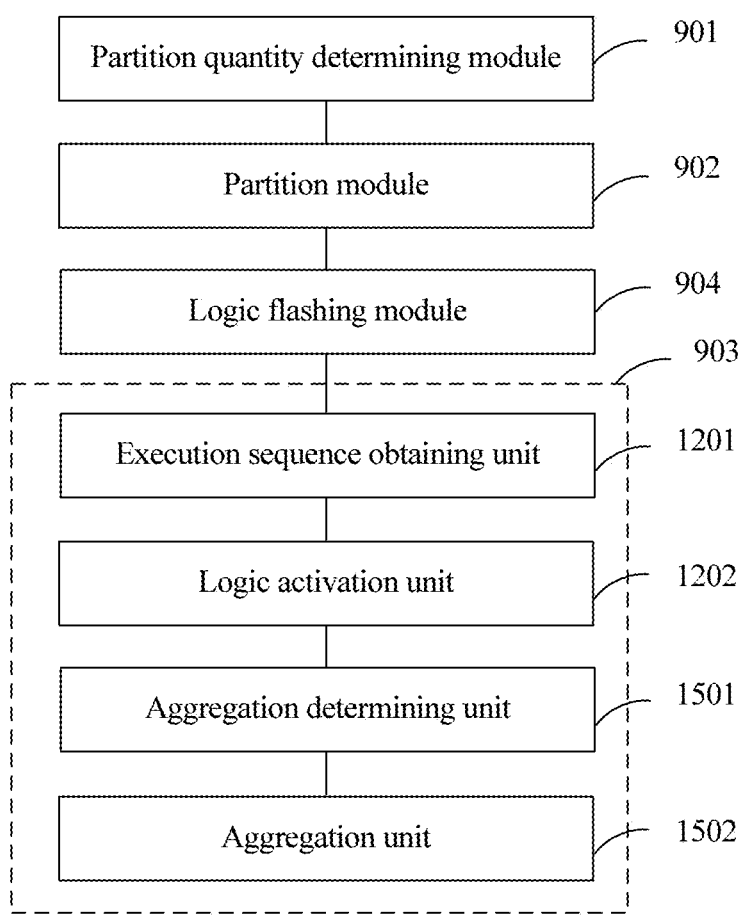
FIG. 15 is another schematic structural diagram of an operation module based on an embodiment shown in FIG. 12.
Figure 16:
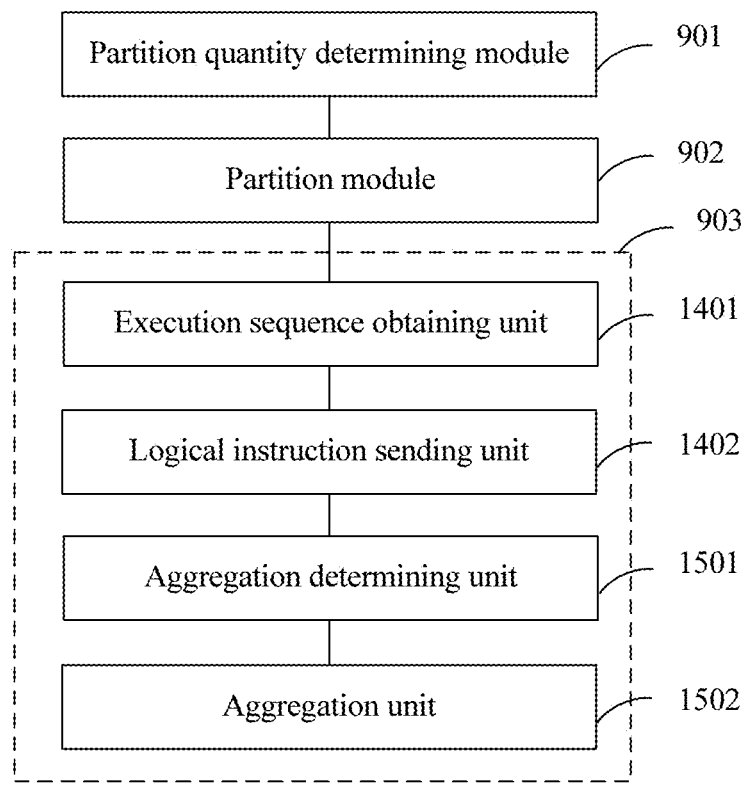
FIG. 16 is another schematic structural diagram of an operation module based on an embodiment shown in FIG. 14.

In still another embodiment, after all relational algebra logical operations corresponding to the logic execution sequence information are executed, operation results are generally distributed in programmable memory partitions, and in this case, whether an aggregation operation needs to be executed on the operation results distributed in different programmable memory partitions to generate a final result may be determined according to an actual scenario. If the aggregation operation needs to be executed, a logic aggregation operation is activated, and the final result is generated according to the operation results distributed in the different programmable memory partitions. Therefore, based on the embodiments shown in FIG. 12 and FIG. 14, as shown in FIG. 15 and FIG. 16, the operation module may further include an aggregation determining unit 1501 configured to, after all relational algebra logical operations corresponding to the logic execution sequence information are executed, determine whether to execute an aggregation operation on operation results distributed in different programmable memory partitions and an aggregation unit 1502 configured to, if the aggregation operation needs to be executed, activate a logic aggregation operation, and generate a final result according to the operation results distributed in the different programmable memory partitions.

Figure 17:
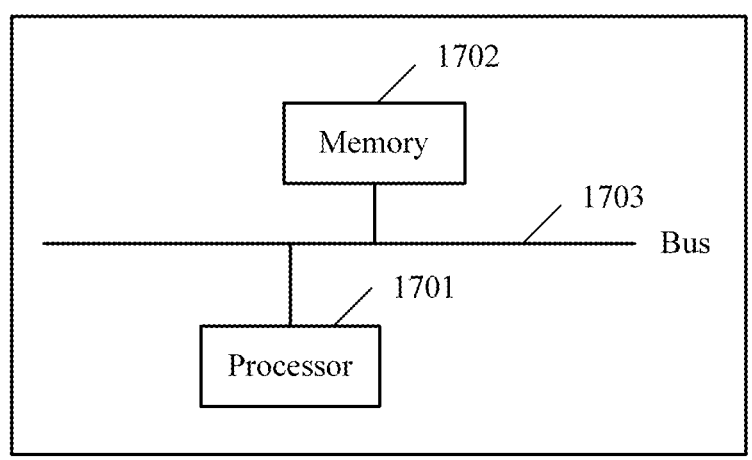
FIG. 17 is a schematic diagram of a data processing apparatus implemented on a basis of a computer system according to an embodiment of the present disclosure.

As shown in FIG. 17, the present disclosure further provides a data processing apparatus implemented on a basis of a computer system. In specific implementation, the data processing apparatus may include a processor 1701, a memory 1702, and a bus 1703, where the processor 1701 and the memory 1702 are connected using the bus 1703, the memory 1702 is configured to store a computer execution instruction, the processor 1701 is configured to execute the computer execution instruction stored in the memory 1702, determine, according to a database execution plan, a partition quantity corresponding to a currently free programmable memory, partition the currently free programmable memory according to the partition quantity, to obtain a free programmable memory partition corresponding to the partition quantity, and execute a corresponding logical operation using the free programmable memory partition.

In specific implementation, the foregoing processor may be a central processing unit, an application-specific integrated circuit (ASIC), or the like. A computer storage medium may store a program and, when being executed, the program may include some or all of the steps in embodiments of the data processing method provided in the embodiments of the present disclosure. The foregoing storage medium may be a magnetic disk, an optical disc, a read-only memory (ROM), a random access memory (RAM), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a universal serial bus (USB) flash drive, a removable hard disk, a read-only memory, a random access memory, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:
1. A data processing method comprising:
   determining, according to a database execution plan, a partition quantity corresponding to a currently free programmable memory;
   partitioning the currently free programmable memory according to the partition quantity to obtain a programmable memory partition corresponding to the partition quantity; and
   executing, using the programmable memory partition, a relational algebra logical operation corresponding to the database execution plan,
   wherein determining, according to the database execution plan, the partition quantity corresponding to the currently free programmable memory at least comprises:

collecting statistics about an optimal value op of a ratio of a data throughput processed when the free programmable memory executes the relational algebra logical operation to a size of the free programmable memory;

determining, according to the database execution plan, an estimated value rc of a data volume required for the database execution plan;

finding a maximum value rp of a ratio of a data area to a complementary area;

obtaining an amount mc of the currently free programmable memory; and determining, according to op, rc, rp, and mc, the partition quantity corresponding to the currently free programmable memory.

2. The method according to claim 1, wherein determining, according to the database execution plan, the partition quantity corresponding to the currently free programmable memory further comprises:

generating an execution plan tree according to the database execution plan; and traversing the execution plan tree to find the maximum value rp of the ratio of the data area to the complementary area, wherein the data area and the complementary area are required for a relational algebra logical operation of a node on the execution plan tree, wherein the data area refers to storage space for storing input/output data information of the relational algebra logical operation, and wherein the complementary area refers to storage space for storing temporary data information obtained during the relational algebra logical operation.

3. The method according to claim 2, wherein before executing the relational algebra logical operation corresponding to the database execution plan, the method further comprises flashing a relational algebra logic set into the programmable memory partition, wherein the relational algebra logic set comprises the relational algebra logical operation corresponding to the database execution plan.

4. The method according to claim 2, wherein executing the relational algebra logical operation corresponding to the database execution plan comprises:

obtaining, according to the execution plan tree, execution sequence information of relational algebra logic corresponding to the database execution plan; and sequentially activating the relational algebra logic in the programmable memory partition according to the execution sequence information to execute an operation.

5. The method according to claim 4, wherein activating the relational algebra logic in the programmable memory partition to execute the operation comprises:

directly obtaining data in a programmable memory partition corresponding to a unary operator to execute the operation when the activated relational algebra logic is the unary operator; and synchronizing data addressing information in the two programmable memory partitions corresponding to a binary operator and executing a currently active logical operation by a programmable memory partition in the two programmable memory partitions that has a larger data volume when the activated relational algebra logic is the binary operator and two programmable memory partitions corresponding to the binary operator have same execution sequence information.

6. The method according to claim 2, wherein executing the relational algebra logical operation corresponding to the database execution plan comprises:

obtaining, according to the execution plan tree, logic execution sequence information of a relational algebra operator corresponding to the database execution plan; and sending a logical instruction to the programmable memory partition according to the logic execution sequence information, and wherein the logical instruction causes the programmable memory partition to execute a logical operation.

7. The method according to claim 4, wherein executing the relational algebra logical operation corresponding to the database execution plan further comprises:

determining whether to execute an aggregation operation on operation results distributed in different programmable memory partitions after all relational algebra logical operations corresponding to the logic execution sequence information are executed; and activating a logic aggregation operation and generating a final result according to the operation results distributed in the different programmable memory partitions when the aggregation operation needs to be executed.

8. A data processing apparatus comprising:
a processor;
a memory configured to store a computer execution instruction; and
a bus coupling the processor and the memory,
wherein the processor is configured to execute the computer execution instruction stored in the memory to:

determine, according to a database execution plan, a partition quantity corresponding to a currently free programmable memory;

partition the currently free programmable memory according to the partition quantity to obtain a programmable memory partition corresponding to the partition quantity;

execute, using the programmable memory partition, a relational algebra logical operation corresponding to the database execution plan;

collect statistics about an optimal value op of a ratio of a data throughput processed when the free programmable memory executes the relational algebra logical operation to a size of the free programmable memory;

determine, according to the database execution plan, an estimated value rc of a data volume required for the database execution plan;

find a maximum value rp of a ratio of a data area to a complementary area;

obtain an amount mc of the currently free programmable memory; and determine, according to op, rc, rp, and mc, the partition quantity corresponding to the currently free programmable memory.

9. The apparatus according to claim 8, wherein the processor is further configured to:

generate an execution plan tree according to the database execution plan; and traverse the execution plan tree to find the maximum value rp of the ratio of the data area to the complementary area, wherein the data area and the complementary area are required for a relational algebra logical operation of a node on the execution plan tree, wherein the data area refers to storage space for storing input/output data information of the relational algebra logical operation, and wherein the complementary area refers to storage space for storing temporary data information obtained during the relational algebra logical operation.

10. The apparatus according to claim 9, the processor is further configured to flash a relational algebra logic set into the programmable memory partition before executing the relational algebra logical operation corresponding to the database execution plan, wherein the relational algebra logic set comprises the relational algebra logical operation corresponding to the database execution plan.

11. The apparatus according to claim 9, wherein the processor is further configured to:
obtain, according to the execution plan tree, execution sequence information of relational algebra logic corresponding to the database execution plan; and
sequentially activate the relational algebra logic in the programmable memory partition according to the execution sequence information to execute an operation.

12. The apparatus according to claim 11, wherein the processor is further configured to:
directly obtain data in a programmable memory partition corresponding to a unary operator to execute the operation when the activated relational algebra logic is the unary operator; and
synchronize data addressing information in the two programmable memory partitions corresponding to a binary operator and execute a currently active logical operation by a programmable memory partition in the two programmable memory partitions that has a larger data volume when the activated relational algebra logic is the binary operator and two programmable memory partitions corresponding to the binary operator have same execution sequence information.

13. The apparatus according to claim 9, wherein the processor is further configured to:
obtain, according to the execution plan tree, logic execution sequence information of a relational algebra operator corresponding to the database execution plan; and
send a logical instruction to the programmable memory partition according to the logic execution sequence information, and wherein the logical instruction causes the programmable memory partition to execute a logical operation.

14. The apparatus according to claim 11, wherein the processor is further configured to:
determine whether to execute an aggregation operation on operation results distributed in different programmable memory partitions after all relational algebra logical operations corresponding to the logic execution sequence information are executed; and
activate a logic aggregation operation and generate a final result according to the operation results distributed in the different programmable memory partitions when the aggregation operation needs to be executed.

15. The method according to claim 1, further comprising determining whether to flash a relational algebra logic set into the programmable memory partition before executing the relational algebra logical operation corresponding to the database execution plan, wherein the relational algebra logic set comprises the relational algebra logical operation corresponding to the database execution plan.

16. The method according to claim 15, wherein determining whether to flash the relational algebra logic set into the programmable memory partition is determined according to a speed of writing logic into a logic control area in the programmable memory partition.

17. The method according to claim 1, wherein before executing the relational algebra logical operation corresponding to the database execution plan, the method further comprises flashing a relational algebra logic set into the programmable memory partition when a speed of writing a new instruction into a logic control area of the programmable memory partition is lower than a threshold.

* * * * *